(12) United States Patent
Gaunt et al.

(10) Patent No.: US 7,197,422 B2
(45) Date of Patent: Mar. 27, 2007

(54) SYSTEM AND METHOD FOR DETERMINING PROPER TIRE INFLATION PRESSURE BASED ON CURRENT VEHICLE MASS CONDITIONS

(75) Inventors: Michael C. Gaunt, Metamora, MI (US); Thomas C. Zebehazy, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 4 days.

(21) Appl. No.: 11/201,826

(22) Filed: Aug. 11, 2005

(65) Prior Publication Data

US 2007/0038408 A1    Feb. 15, 2007

(51) Int. Cl.
*G01L 7/00*    (2006.01)

(52) U.S. Cl. .................. 702/138; 702/98; 73/146.2; 340/442; 116/34 R

(58) Field of Classification Search ................ 702/138, 702/98; 73/146.2, 146, 862.38; 701/1, 2, 701/136; 340/442; 116/34 R
See application file for complete search history.

(56) References Cited

U.S. PATENT DOCUMENTS

| | | | |
|---|---|---|---|
| 6,150,617 A | 11/2000 | Hart et al. | |
| 6,314,383 B1 | 11/2001 | Leimbach et al. | |
| 6,347,269 B1 | 2/2002 | Hayakawa et al. | |
| 6,446,024 B1 | 9/2002 | Leimbach et al. | |
| 6,499,343 B1 | 12/2002 | Haas et al. | |
| 6,567,734 B2 | 5/2003 | Bellinger et al. | |
| 6,625,535 B2 | 9/2003 | Han et al. | |
| 6,810,727 B1 * | 11/2004 | Davis et al. | 73/146.2 |
| 2005/0139000 A1 * | 6/2005 | Walenty et al. | 73/146.5 |

\* cited by examiner

*Primary Examiner*—John Barlow
*Assistant Examiner*—Hien Vo
(74) *Attorney, Agent, or Firm*—Laura C. Hargitt

(57) ABSTRACT

A tire pressure monitoring system as described herein leverages a real-time onboard vehicle mass estimate to determine whether tire pressure is appropriate for the current loading conditions. The system is suitable for use with vehicles having two or more placard tire pressures (with two or more corresponding tire loading capacities). The system can notify the driver to adjust the tire pressure to the proper placard tire pressure for the given load conditions, and/or initiate automatic inflation or deflation by an onboard tire inflation system.

18 Claims, 3 Drawing Sheets

SYSTEM AND METHOD FOR DETERMINING PROPER TIRE INFLATION PRESSURE BASED ON CURRENT VEHICLE MASS CONDITIONS

TECHNICAL FIELD

The present invention generally relates to vehicle tire pressure monitoring systems, and more particularly relates to a tire pressure monitoring system that determines proper tire inflation pressure in response to an estimated vehicle mass value that is generated by an onboard module.

BACKGROUND

Tire pressure monitoring systems are becoming very popular in many vehicles. Conventional tire pressure monitoring systems measure the current tire pressures and notify the driver if the pressure in a given tire falls below a recommended tire pressure (the factory-recommended tire pressure is often referred to as the placard tire pressure). Known tire pressure monitoring systems can only monitor a single pressure setting for each tire. Many heavy duty vehicles, such as full size trucks and some SUVs, are sold with E-load rated tires having dual placard tire pressures (one recommended tire pressure for relatively light loading conditions and a different recommended tire pressure for relatively heavy loading conditions). Typically, the lower tire pressure setting provides improved ride comfort under lightly loaded conditions, while the higher pressure setting provides additional support needed for heavy loads.

Normally, a driver of a vehicle having dual placard tire pressures is responsible for determining the rear axle mass and, based on that mass, adjusting the rear tire pressure in an appropriate manner. It can be difficult for most drivers to accurately measure the rear axle mass of the vehicle, therefore, the resulting tire pressure adjustment may be based on simple guesswork. Furthermore, conventional tire pressure monitoring systems do not consider the vehicle mass and, therefore, are not readily capable of supporting vehicles having dual placard tire pressures.

Accordingly, it is desirable to have a tire pressure monitoring system that is suitable for vehicles having tires with dual placard pressures. In addition, it is desirable to have a tire pressure monitoring system that leverages an onboard vehicle mass estimation system. Furthermore, other desirable features and characteristics of the present invention will become apparent from the subsequent detailed description and the appended claims, taken in conjunction with the accompanying drawings and the foregoing technical field and background.

BRIEF SUMMARY

A tire pressure monitoring system configured in accordance with an example embodiment of the invention can be effectively utilized in a vehicle having tires with two or more placard tire pressures (i.e., different pressures for different loading conditions). The system can determine and recommend the proper rear tire inflation pressure based upon an estimated rear axle mass value, which is related to the current loading condition.

The above and other aspects of the invention may be carried out in one form by a computerized method for determining proper tire inflation pressure for a vehicle having a first placard tire pressure for a first load condition and a second placard tire pressure for a second load condition. The method involves: obtaining an estimated rear axle mass value for the vehicle, the estimated rear axle mass value being indicative of a current load condition for the vehicle; obtaining a measured tire pressure for a rear tire of the vehicle; and indicating adjustment of tire pressure for the rear tire to either the first placard tire pressure or the second placard tire pressure. The adjustment indication is performed in response to the estimated rear axle mass value and in response to the measured tire pressure.

BRIEF DESCRIPTION OF THE DRAWINGS

The present invention will hereinafter be described in conjunction with the following drawing figures, wherein like numerals denote like elements.

DETAILED DESCRIPTION

Figure 1:
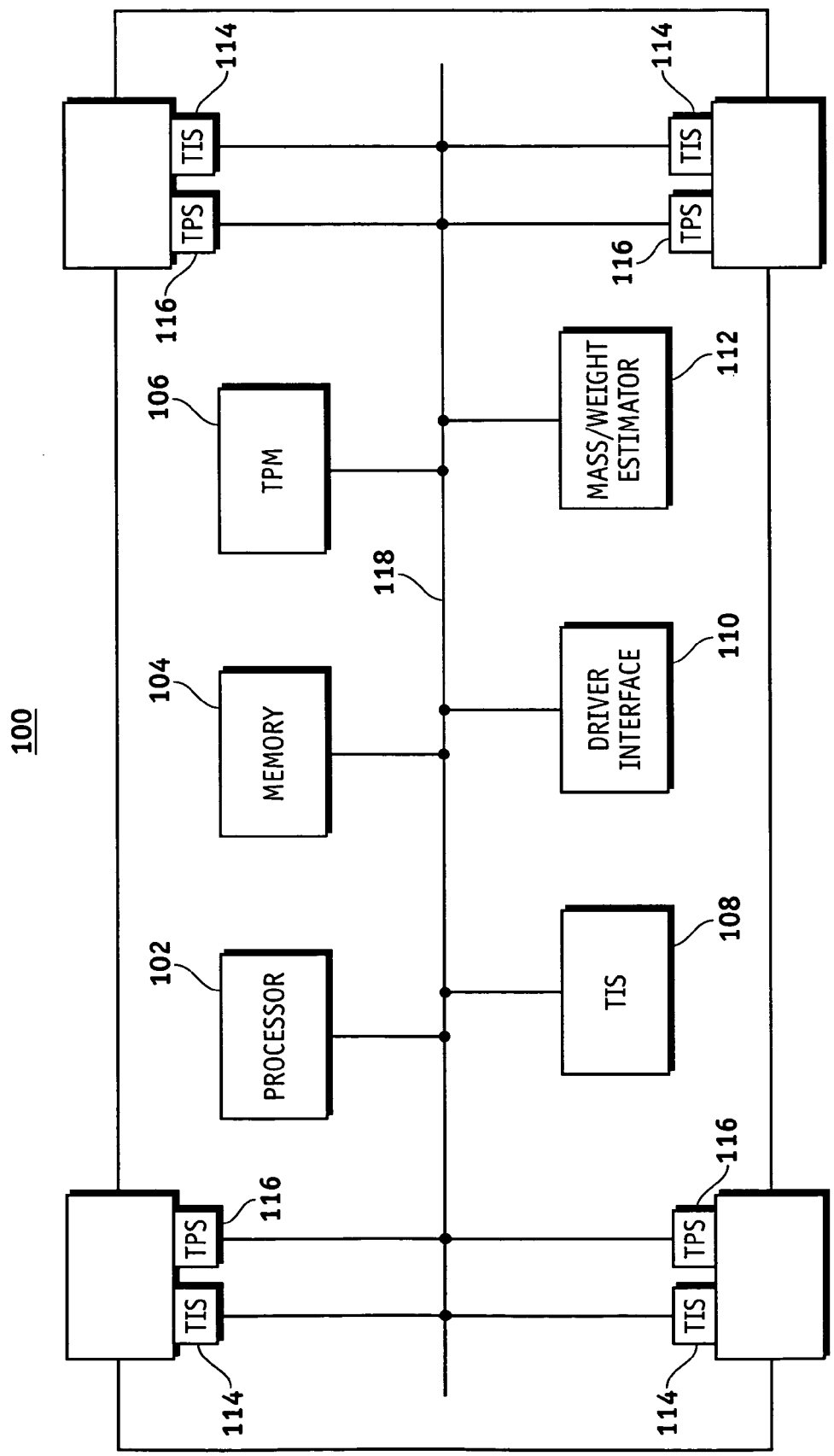
FIG. 1 is a schematic representation of a vehicle having a tire pressure monitoring system configured in accordance with an example embodiment of the invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of different vehicle configurations and that the particular system described herein is merely one exemplary application for the invention.

For the sake of brevity, conventional techniques and features related to vehicle computer systems, vehicle electronic control units, tire pressure monitoring systems, mass estimation systems, vehicle network communication, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. Thus, although the schematic diagrams shown herein depict example arrangements of elements, additional intervening elements, devices, features, or components may be present in an actual embodiment (assuming that the functionality of the system is not adversely affected).

The use of the term "mass" is not intended to restrict or narrow the scope of the invention in any way. In this regard, a practical application of the system described herein can be configured to process mass (in kilogram units, for example) and/or weight (in pound units, for example), and the system can be configured to perform conversions between units as necessary.

The invention relates to a tire pressure monitoring ("TPM") system suitable for deployment in a vehicle having tires with dual placard tire pressures. In this regard, the vehicle is configured to accept two settings for the TPM system: one setting represents a lower placard tire pressure and a load rating corresponding to the lower placard tire pressure; and the other setting represents a higher placard tire pressure and a load rating corresponding to the higher placard tire pressure. Dual placard pressures are typically used for the rear tires in a heavy duty vehicle. Accordingly, the example embodiment described herein addresses rear axle loading. The TPM techniques, however, can be extended for equivalent use in connection with front axle loading.

In a practical deployment, the TPM system utilizes suitably configured processing logic and processing algorithms that will notify or instruct the driver to adjust the rear tire pressures based upon an estimated rear axle mass value for the vehicle and the measured tire pressure. In practice, the TPM system can leverage various inputs, data, and signals obtained from other electronic control modules ("ECUs") in the vehicle. For example, a vehicle mass estimation and a trailer detection signal may be provided by a power train control module, tire pressures may be provided by wheel-mounted tire pressure sensors, and vehicle curb mass values may be provided by a body control module (such curb mass values may be stored in memory during manufacturing of the vehicle).

To estimate the rear axle mass, the TPM system assumes that any additional mass beyond the vehicle curb mass (including a portion of the driver's mass) is applied to the rear axle. Since a practical mass estimation algorithm may not be able to determine the mass of an attached trailer, in most cases the driver would be notified to increase the rear tire pressure in response to the detection of a trailer. As described in more detail below, the TPM system is preferably configured to handle trailer conditions and non-trailer conditions differently.

If the vehicle is equipped with an automated tire inflation system ("TIS"), the TPM system can also be utilized to update the tire pressure set point for the TIS such that the TIS can automatically increase or decrease the tire pressure under the control of the TPM system. In practice, the driver can be notified that the tire pressure was changed to accommodate the current load condition.

FIG. 1 is a schematic representation of a vehicle 100 having a tire pressure monitoring system configured in accordance with an example embodiment of the invention. The various block modules depicted in FIG. 1 may be realized in any number of physical components or modules located throughout vehicle 100. A practical vehicle may include a number of additional ECUs, computer systems, and components other than those shown in FIG. 1; conventional subsystems, features, and aspects of vehicle 100 will not be described in detail herein.

Vehicle 100 generally includes a processor 102, memory 104, a TPM module 106, a TIS module 108, a driver interface 110, a mass estimator 112, TIS control units 114, and tire pressure sensors 116. In practice, these elements may be coupled together using at least one data communication bus 118 or any suitable interconnection architecture, technique, or arrangement.

Processor 102 is configured to perform, control, and/or regulate the TPM techniques described herein. Although only one processor block is shown in FIG. 1, a practical implementation may utilize any number of distinct physical and/or logical processors, which may be dispersed throughout vehicle 100. For example, each ECU in vehicle 100 may include an associated processor element or associated processing logic. In practice, processor 102 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. Memory 104 has sufficient capacity to accommodate the TPM techniques described herein. For example, memory 104 may be configured to store the different placard tire pressures, the load thresholds corresponding to the placard tire pressures, the measured tire pressures obtained from tire pressure sensors 116, factory-stored quantities such as curb mass, and the like. Memory 104 may be realized as RAM memory, flash memory, ROM memory, EPROM memory, EEPROM memory, registers, a hard disk, a removable disk, a CD-ROM, or any other form of storage medium known in the art.

The steps of a method or algorithm described in connection with the embodiments disclosed herein may be embodied directly in hardware, in firmware, in a software module executed by a processor, or in any practical combination thereof. In this regard, a software module may reside in memory 104 or any other suitable storage medium. In practice, memory 104 can be coupled to processor 102 such that processor 102 can read information from, and write information to, memory 104. In the alternative, memory 104 may be integral to processor 102. As an example, processor 102 and memory 104 may reside in an ASIC.

TPM module 106 is suitably configured to perform the TPM functions described herein. For example, TPM module 106 may process the measured tire pressures obtained by tire pressure sensors 116, process mass estimation data provided by mass estimator 112, control the generation of driver notifications, and control TIS module 108. In the example embodiment described herein, TPM module 106 (and/or processor 102) is configured to indicate adjustment of tire pressure for the rear tires to either a first placard tire pressure or a second placard tire pressure, in response to an estimated rear axle mass value and in response to the measured tire pressure. TPM module 106 may also be configured to perform conventional TPM functions, which are known to those skilled in the art.

TIS module 108 is suitably configured to perform the TIS functions described herein. For example, TIS module 108 may process tire pressure set points generated by TPM module 106 and, if needed, initiate inflation or deflation of the tires by TIS control units 114. Thus, a TIS system may include TIS module 108 and TIS control units 114, and the TIS system may be suitably configured to automatically adjust tire pressure to one of the placard tire pressures as determined by the processor 102 and/or the processing logic utilized by vehicle 100. Automated tire inflation systems are generally known to those skilled in the art and, therefore, the operation of such systems will not be described in detail herein.

Driver interface 110 represents one or more instruments, displays, gauges, lights, readouts, or the like, which are typically located on the vehicle dashboard. In some vehicles, driver interface 110 represents a single electronic display unit that is capable of providing information related to multiple vehicle systems, e.g., climate control, maintenance, entertainment, navigation, TPM, and other data. In the context of the TPM system described herein, driver interface 110 is suitably configured to convey tire pressure notifications and/or instructions to the driver in response to the processing of the real-time TPM and mass estimation data obtained by the onboard vehicle subsystems.

Mass estimator 112 is suitably configured to generate various mass values utilized by the TPM system described herein. For example, mass estimator 112 may generate an estimated rear axle mass value for the vehicle, where the estimated rear axle mass value is indicative of the current load condition for the vehicle. Mass estimator 112 may also generate an overall estimated vehicle mass for vehicle 100 (and, if applicable, a trailer attached to vehicle 100). Moreover, mass estimator 112 may calculate other mass values that are used to derive the estimated rear axle mass value.

Tire pressure sensors 116 are suitably configured to obtain a measured tire pressure for their respective tires. In practice, tire pressure sensors 116 may be mounted on each wheel to directly measure the internal pressure of each tire. Tire pressure sensors 116 may convey the measured tire pressure data to TPM module 106 via a wireless communication link, bus 118, or any suitable data communication technique. One benefit of the TPM system described herein is that it need not use customized tire pressure sensors 116, and conventional tire pressure sensor technology can be leveraged.

A TPM system configured in accordance with the example embodiment of the invention generally operates in the following manner. First, the TPM system generates or obtains an estimated rear axle mass ("ERAM") value, which may include a contribution from a trailer attached to the vehicle. Next, the TPM system processes the current measured rear tire pressure and the ERAM value to determine whether the current measured rear tire pressure is proper for the current loading conditions. Next, the TPM system notifies the driver by indicating adjustment of the rear tire pressure to either the first placard pressure or the second placard pressure as necessary. If the vehicle is equipped with a TIS, then the TPM system can initiate automatic adjustment of the tire pressure.

As mentioned above, the ERAM value may include a contribution from a trailer attached to the vehicle. Thus, the TPM system may employ different algorithms for calculating the ERAM value. For example, if no trailer is attached to the vehicle, then the TPM system may calculate the ERAM value as follows:

$$AVM = VME - CM; \text{ and}$$

$$ERAM = AVM + RACM;$$

where AVM is the additional vehicle mass associated with the current loading of the vehicle; VME is the vehicle mass estimate (as determined by, for example, mass estimator 112); CM is the curb mass of the vehicle, which may include the mass of the driver; and RACM is the rear axle curb mass, which may include a percentage of the mass of the driver. The values for CM and RACM may be factory-stored values that contemplate an estimated or average mass for a typical driver, the VME value may be generated in real-time by the system, and the AVM and ERAM values can be calculated from the other variables in the above relationships. The AVM is the difference between the currently estimated vehicle mass and the fixed CM value, and the ERAM value assumes that the AVM is supported by the rear axle (which is a close approximation to most practical loading conditions).

If a trailer is attached to the vehicle, but the trailer is not detected by the vehicle (or if the mass of the trailer cannot be determined), then the TPM system may calculate the ERAM value as follows:

$$AVM = VME \text{ (with trailer)} - CM; \text{ and}$$

$$ERAM = AVM \text{ (with trailer)} + RACM.$$

These relationships are as set forth above; however, the VME considers the combined mass of the vehicle and the trailer.

If a trailer is attached to the vehicle and the mass of the trailer is known or can be derived, then the TPM system may calculate the ERAM as follows:

$$TW = 0.20 \times TM \text{ (or } TW = \text{measured tongue weight)};$$

$$AVM = VME - TM - CM; \text{ and}$$

$$ERAM = AVM + [TW \times (X \div WB)/WB] + RACM;$$

where TW is the tongue weight of the trailer load (i.e., the weight of the trailer actually supported by the vehicle, typically supported by a trailer hitch ball); TM is the total mass of the trailer; X is the distance from the center of the rear axle to the trailer hitch point; and WB is the vehicle wheelbase. The value for WB may be a factory-stored value, the X value may be a factory-stored value or it may be entered into the TPM system by the driver, and the TM value may be entered into the TPM system by the driver, or it may be directly measured using, for example, a horizontal force transducer on the trailer's tongue and the equation F=ma. The TW value can be directly measured using, for example, a vertical force transducer on the hitch ball. If not directly measured, TW can be calculated by assuming that it equals a certain percentage (e.g., 20% in this example) of the total trailer mass. The actual percentage may vary from one TPM system to another, and the use of 20% in this example is not intended to limit or restrict the scope of the invention in any way.

When the trailer mass can be determined, the AVM value does not include the total trailer mass. Rather, the AVM value is intended to represent the true additional mass associated with the load on the vehicle. Moreover, the ERAM value is calculated to better estimate the true loading over the rear axle of the vehicle.

If a "fifth wheel" trailer (i.e., a trailer where the hitch point is located over the rear axle) is attached to the vehicle and the mass of the trailer is known or can be derived, then the TPM system may calculate the ERAM as follows:

$$AVM=VME-TM;\text{ and}$$

$$ERAM=AVM+(0.25\times TM)+RACM.$$

This situation assumes that the trailer directly loads the vehicle over the rear axle, and the AVM and ERAM values reflect this assumption. When using a fifth wheel trailer, it is recommended to have 15–25 percent of the trailer's mass on the hitch ball located over the rear axle of the vehicle. The mass (0.25×TM) is therefore applied directly to the rear axle mass. Of course, the 25% value has been chosen for this particular example, and the invention is not limited to any specific percentage.

A practical deployment of a TPM system may utilize additional and/or alternative relationships that those described above. The specific relationships and techniques for determining the ERAM value for the vehicle can be customized to suit the needs of the particular vehicle, trailer, load conditions, or the like.

Figure 2:
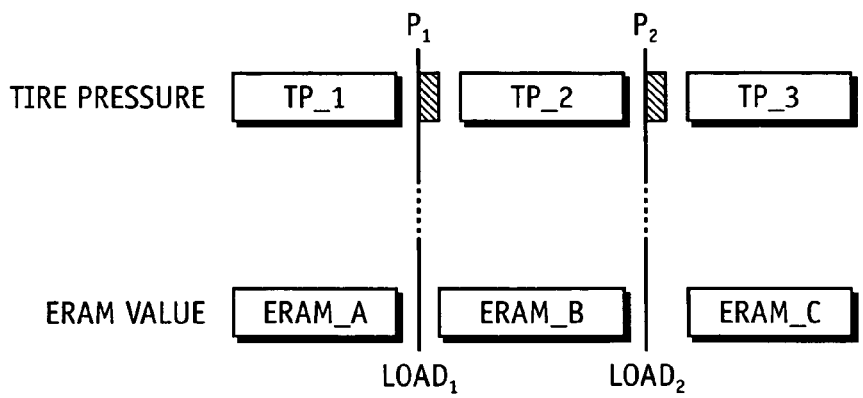
FIG. 2 is a diagram that illustrates different tire pressure and loading conditions associated with a vehicle having tires with two placard tire pressures.

As mentioned above, the TPM system processes the current measured rear tire pressure and the calculated ERAM value to determine whether the current measured rear tire pressure is proper for the current loading conditions. In this regard, FIG. 2 is a diagram that illustrates different tire pressure and loading conditions associated with a vehicle having tires with two placard tire pressures. FIG. 2 graphically depicts different possible operating thresholds for the vehicle: a low placard tire pressure (e.g., 50 psi, identified as $P_1$); a high placard tire pressure (e.g., 80 psi, identified as $P_2$); a low loading value corresponding to the low placard tire pressure (e.g., 2000 kg, identified as $LOAD_1$); and a high loading value corresponding to the high placard tire pressure (e.g., 2760 kg, identified as $LOAD_2$). The area near the top of FIG. 2 represents different measured tire pressure ranges, and the area near the bottom of FIG. 2 represents different ERAM values, which may be determined in the manner described above. In practice, these ERAM values may represent the sum of the actual ERAM quantities calculated as described above and an appropriate safety margin. The safety margin may be, for example 100 kg to account for calculation errors, measurement errors, and to provide a general factor of safety.

The following algorithm may be performed by the TPM system to determine whether the current rear tire pressure of the vehicle is proper. If the currently measured tire pressure is less than or equal to the low placard tire pressure (e.g., in the TP_1 range of FIG. 2) and the calculated ERAM value is less than or equal to the low loading value (e.g., in the ERAM_A range of FIG. 2), then the TPM system indicates a low pressure condition, if it exists, and instructs the driver to inflate the rear tires to the low placard tire pressure. If the vehicle is equipped with a TIS, then the TPM system may also initiate automatic tire inflation. If the currently measured tire pressure is in the TP_1 range and the calculated ERAM value is greater than the low loading value and less than or equal to the high loading value (e.g., in the ERAM_B range of FIG. 2), then the TPM system instructs the driver to inflate the rear tires to the high placard tire pressure. If the vehicle is equipped with a TIS, then the TPM system may also initiate automatic tire inflation. If the currently measured tire pressure is in the TP_1 range and the calculated ERAM value is greater than the high loading value (e.g., in the ERAM_C range of FIG. 2), then the TPM system instructs the driver to inflate the rear tires to the high placard tire pressure, and to verify that the rear gross axle mass rating is not exceeded. In practice, the driver could take the vehicle to a scale to make this verification, and the mass limits for a vehicle and trailer are typically found in the owner's manual. If the vehicle is equipped with a TIS, then the TPM system may also initiate automatic tire inflation.

If the currently measured tire pressure is greater than the low placard tire pressure plus a temperature allowance, and is less than the high placard tire pressure (e.g., in the TP_2 range of FIG. 2), and if the calculated ERAM value is in the ERAM_A range, then the TPM system instructs the driver to deflate the rear tires to the low placard tire pressure. If the vehicle is equipped with a TIS, then the TPM system may also initiate automatic tire deflation. The temperature allowance (identified by the cross-hatched box in FIG. 2) can be utilized to account for increased tire pressure caused by high ambient temperatures and internal heat generated by the rolling tire. In a practical embodiment, the temperature allowance may be approximately 10% for the given cold tire pressure. If the currently measured tire pressure is in the TP_2 range and the calculated ERAM value is in the ERAM-B range, then the TPM system instructs the driver to inflate the rear tires to the high placard tire pressure. If the vehicle is equipped with a TIS, then the TPM system may also initiate automatic tire inflation. If the currently measured tire pressure is in the TP_2 range and the calculated ERAM value is in the ERAM_C range, then the TPM system instructs the driver to inflate the rear tires to the high placard tire pressure, and to verify that the rear gross axle mass rating is not exceeded. If the vehicle is equipped with a TIS, then the TPM system may also initiate automatic tire inflation.

If the currently measured tire pressure is greater than or equal to the high placard tire pressure plus a temperature allowance (e.g., in the TP_3 range of FIG. 2), and the calculated ERAM value is in the ERAM_A range, then the TPM system instructs the driver to deflate the rear tires to the low placard tire pressure. The system could also inform the driver that the tire pressure exceeds the recommended high placard value. If the vehicle is equipped with a TIS, then the TPM system may also initiate automatic tire deflation. If the currently measured tire pressure is in the TP_3 range and the calculated ERAM value is in the ERAM_B range, then the TPM system need not take any action. Alternatively, the system could inform the driver that the tire pressure exceeds the recommended limit and to deflate the tire to the high placard value (if the vehicle is equipped with a TIS, the notification and deflation could be performed automatically). If the currently measured tire pressure is in the TP_3 range and the calculated ERAM value is in the ERAM_C range, then the TPM system instructs the driver to deflate the rear tires to the high placard tire pressure, and to verify that the rear gross axle mass rating is not exceeded. If the vehicle is equipped with a TIS, then the TPM system may also initiate automatic tire deflation.

The above technique results in a proper adjustment of the rear tire pressure to accommodate the current rear axle loading conditions of the vehicle. It should be appreciated that the technique can be extended for use with tires having more than two placard tire pressure ratings, and can be extended for use with front tires and front axle loading conditions.

Figure 4:
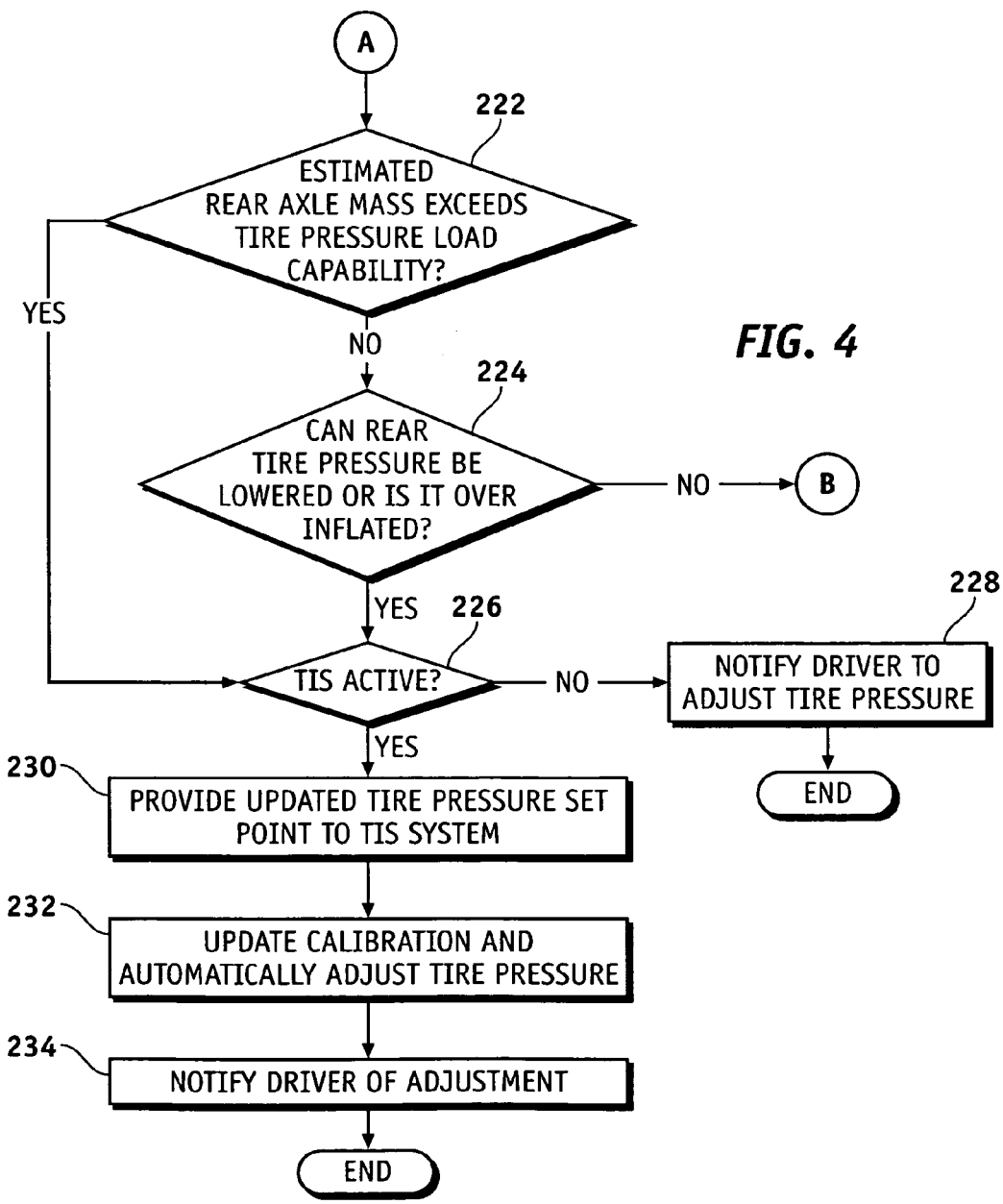
FIGS. 3 and 4 contain a flow chart of a tire pressure monitoring process according to an example embodiment of the invention.
Figure 3:
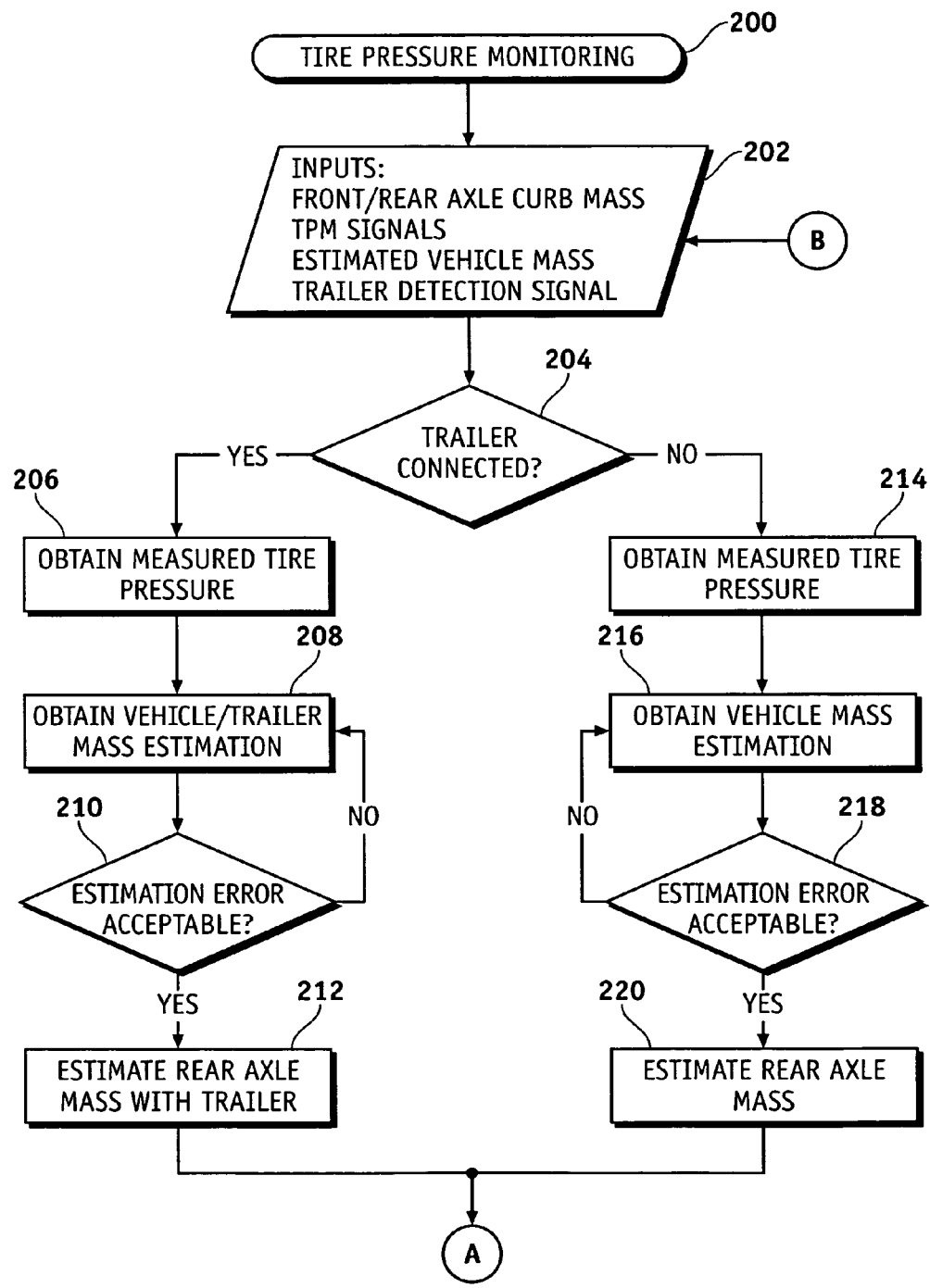

FIGS. 3 and 4 contain a flow chart of a tire pressure monitoring process 200 according to an example embodiment of the invention. The various tasks performed in connection with process 200 may be performed by software, hardware, firmware, or any combination thereof. For illustrative purposes, the following description of process 200 may refer to elements mentioned above in connection with FIG. 1. In practical embodiments, portions of process 200 may be performed by different elements of the described system, e.g., processor 102, TPM module 106, mass estimator 112, or tire pressure sensors 116. It should be appreciated that process 200 may include any number of additional or alternative tasks, the tasks shown in FIGS. 3 and 4 need not be performed in the illustrated order, and process 200 may be incorporated into a more comprehensive procedure or process having additional functionality not described in detail herein.

Tire pressure monitoring process 200 may begin by obtaining one or more inputs 202 including, without limitation: the front and/or rear axle curb mass; tire pressure sensor signals; estimated vehicle mass data, such as VME values as described above; a trailer detection signal; and other information as described herein. The estimated vehicle mass data may be generated using any suitable process or algorithm that indirectly determines mass or loading conditions of the vehicle. One suitable technique is described in U.S. Pat. No. 6,625,535, the content of which is incorporated by reference herein. Briefly, this technique indirectly estimates vehicle mass in real-time without the use of either a grade or mass sensor. Rather, a vehicle mass estimation is based upon vehicle speed, delivered engine torque, transmission ratios, tire diameter, etc.

Process 200 may check for the presence of a connected trailer (query task 204), for example, by processing a trailer detection signal. If a trailer is detected, then process 200 obtains a measured tire pressure for the rear tires of the vehicle (task 206). In addition, process 200 obtains a vehicle/trailer mass estimation value (task 208) for the vehicle and trailer. Task 208 may, for example, obtain the VME value (with the trailer) using the relationships described above. In practical embodiments, the system may perform a smoothing or averaging technique to ensure that the calculated VME value does not contain errors which may be caused by dynamic vehicle operating conditions. In this regard, if the estimation error associated with the VME value is not acceptable (query task 210), then process 200 may repeat task 208. This loop may be repeated until the estimation error is below a threshold error value.

If the VME value is acceptable, then process 200 may proceed to estimate the rear axle mass with the trailer (task 212). In the example embodiment described herein, task 212 generates an ERAM value for the vehicle, where the ERAM value is indicative of a current load condition for the vehicle. As mentioned above, the ERAM value resulting from task 212 may represent a sum of a calculated ERAM value or quantity and a safety margin value. In the examples provided above, the ERAM value resulting from task 212 is derived from a calculated VME value, a stored CM value, and a stored RACM value. Moreover, the ERAM value resulting from task 212 may be derived from a TM value and/or a TW value for the trailer coupled to the vehicle.

If a trailer is not detected (or if the trailer mass cannot be derived or determined), then process 200 obtains a measured tire pressure for the rear tires of the vehicle (task 214). In addition, process 200 obtains a vehicle mass estimation value (task 216) for the vehicle. Task 216 may, for example, obtain the VME value using the relationships described above. Task 216 and a query task 218 may form a smoothing or averaging processing loop as described above in connection with task 208 and query task 210.

If the VME value is acceptable, then process 200 may proceed to estimate the rear axle mass (task 220). In the example embodiment described herein, task 220 generates an ERAM value for the vehicle in the manner described above. Task 212 and task 220 may lead to a query task 222 (see FIG. 4) that determines whether the calculated ERAM value exceeds the tire pressure load capability for the tires. If so, then process 200 can proceed to a query task 226 as discussed below. If not, then process 200 may perform a query task 224 to check whether the rear tire pressures can be lowered. If query task 224 determines that the rear tire pressures cannot be lowered, then process 200 may be re-entered at block 202 (see FIG. 3) to continue monitoring the current tire pressure. Regarding query task 224, the tire pressure would not be lowered if, for example, the pressure is at the low placard value and the ERAM value is less than the low loading value (see FIG. 2), and the tire pressure would not be lowered if the pressure is at the high placard value and the ERAM value is between the low and high loading values.

If, however, query task 224 determines that the rear tire pressure can be lowered, then process 200 may perform query task 226 to check whether the vehicle has an active TIS system (query task 226 is also initiated if query task 222 determines that the ERAM value is excessive). If the vehicle is not equipped with a TIS system, or if the TIS system in the vehicle is inactive or disabled, then process 200 may notify, instruct, or otherwise inform the driver to adjust the tire pressure (task 228). The indication provided by the system may include the appropriate placard tire pressure and may include an instruction to either inflate or deflate the tires as needed. In this manner, process 200 indicates adjustment of tire pressure for the rear tires to either the low placard tire pressure or the high placard tire pressure, and such indication is responsive to the ERAM value, the measured rear tire pressure, the placard tire pressures, and/or the load thresholds corresponding to the placard tire pressures.

If, however, query task 226 detects an active TIS system in the vehicle, then an updated tire pressure set point may be provided to the TIS system, e.g., to TIS module 108 (task 230). In the example embodiment, task 230 allows the TIS system to switch between multiple placard tire pressures. In response to the updated set point, the TIS system may also update its calibration and automatically adjust the tire pressure for the rear tire(s) to the appropriate placard tire pressure (task 232), where such adjustment may correspond to inflation or deflation as needed. In addition, process 200 may notify or inform the driver of the automatic adjustment (task 234).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A computerized method for determining proper tire inflation pressure for a vehicle having a first placard tire pressure for a first load condition and a second placard tire pressure for a second load condition, said method comprising:
   obtaining an estimated axle mass value for the vehicle, said estimated axle mass value being indicative of a current load condition for the vehicle;
   obtaining a measured tire pressure for a tire of the vehicle; and
   indicating adjustment of tire pressure for said tire to either the first placard tire pressure or the second placard tire pressure, in response to said estimated axle mass value and in response to said measured tire pressure.

2. A method according to claim 1, further comprising performing vehicle mass estimation with an onboard electronic control unit to obtain said estimated axle mass value.

3. A method according to claim 1, wherein said estimated axle mass value is the sum of a calculated axle mass value and a safety margin value.

4. A method according to claim 1, wherein said estimated axle mass value is derived from a calculated vehicle mass value, a stored curb mass value, and a stored axle curb mass value.

5. A method according to claim 1, wherein said estimated axle mass value is derived from a trailer mass of a trailer coupled to the vehicle.

6. A method according to claim 1, further comprising automatically adjusting tire pressure for said tire to either the first placard tire pressure or the second placard tire pressure, in response to said indicating step.

7. A computerized tire pressure monitoring system for a vehicle having a first placard tire pressure for a first load condition and a second placard tire pressure for a second load condition, said system comprising:
   a tire pressure sensor configured to obtain a measured tire pressure for a rear tire of the vehicle;
   a mass estimator configured to generate an estimated rear axle mass value for the vehicle, said estimated rear axle mass value being indicative of a current load condition for the vehicle; and
   a processor, coupled to said tire pressure sensor and to said mass estimator, said processor being configured to indicate adjustment of tire pressure for said rear tire to either the first placard tire pressure or the second placard tire pressure, in response to said estimated rear axle mass value and in response to said measured tire pressure.

8. A system according to claim 7, wherein said estimated rear axle mass value is the sum of a calculated rear axle mass value and a safety margin value.

9. A system according to claim 7, wherein said mass estimator derives said estimated rear axle mass value from a calculated vehicle mass value, a stored curb mass value, and a stored rear axle curb mass value.

10. A system according to claim 7, wherein said mass estimator derives said estimated rear axle mass value from a trailer mass of a trailer coupled to the vehicle.

11. A system according to claim 7, further comprising an automatic tire inflation system coupled to said processor, said automatic tire inflation system being configured to automatically adjust tire pressure for said rear tire to either the first placard tire pressure or the second placard tire pressure, as determined by said processor.

12. A computerized tire pressure monitoring system for a vehicle, said system comprising:
   memory for storing a first placard tire pressure, a first load threshold corresponding to said first placard tire pressure, a second placard tire pressure, and a second load threshold corresponding to said second placard tire pressure; and
   a processor, coupled to said memory, said processor comprising processing logic configured to:
      obtain an estimated rear axle mass value for the vehicle, said estimated rear axle mass value being indicative of a current load condition for the vehicle;
      obtain a measured tire pressure for a rear tire of the vehicle; and
      determine adjustment of tire pressure for said rear tire to either said first placard tire pressure or said second placard tire pressure, in response to said estimated rear axle mass value and in response to said measured tire pressure.

13. A system according to claim 12, said processing logic being configured to determine adjustment of tire pressure for said rear tire in response to said first load threshold.

14. A system according to claim 12, said processing logic being configured to determine adjustment of tire pressure for said rear tire in response to said second load threshold.

15. A system according to claim 12, wherein said estimated rear axle mass value is the sum of a calculated rear axle mass value and a safety margin value.

16. A system according to claim 12, wherein said estimated rear axle mass value is derived from a calculated vehicle mass value, a stored curb mass value, and a stored rear axle curb mass value.

17. A system according to claim 12, wherein said estimated rear axle mass value is derived from a trailer mass of a trailer coupled to the vehicle.

18. A system according to claim 12, said processing logic being configured to initiate automatic adjustment of tire pressure for said rear tire to either the first placard tire pressure or the second placard tire pressure.

* * * * *